(12) United States Patent
Lee et al.

(10) Patent No.: US 10,684,428 B2
(45) Date of Patent: Jun. 16, 2020

(54) FRONT LIGHT UNIT AND IMAGE DISPLAY DEVICE

(71) Applicant: LG Innotek Co., Ltd., Seoul (KR)

(72) Inventors: Sang Hun Lee, Seoul (KR); Min Kim, Seoul (KR); Tae Kyung Kim, Seoul (KR); Jung In Jang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 218 days.

(21) Appl. No.: 15/553,924

(22) PCT Filed: Feb. 26, 2016

(86) PCT No.: PCT/KR2016/001922
§ 371 (c)(1),
(2) Date: Aug. 25, 2017

(87) PCT Pub. No.: WO2016/137274
PCT Pub. Date: Sep. 1, 2016

(65) Prior Publication Data
US 2018/0045902 A1 Feb. 15, 2018

(30) Foreign Application Priority Data

Feb. 26, 2015 (KR) .................. 10-2015-0026973
Feb. 26, 2015 (KR) .................. 10-2015-0027214
Feb. 26, 2015 (KR) .................. 10-2015-0027229

(51) Int. Cl.
*G02B 5/32* (2006.01)
*G02B 6/42* (2006.01)
(Continued)

(52) U.S. Cl.
CPC ............. *G02B 6/4204* (2013.01); *G02B 5/32* (2013.01); *G02B 6/005* (2013.01); *G02B 6/0023* (2013.01);
(Continued)

(58) Field of Classification Search
CPC ............... G02B 27/01; G02B 27/0103; G02B 27/0172; G02B 5/12; G02B 5/32;
(Continued)

(56) References Cited

U.S. PATENT DOCUMENTS

| | | | |
|---|---|---|---|
| 5,489,965 A * | 2/1996 | Mukai | G03B 17/20 396/296 |
| 2004/0189902 A1 | 9/2004 | Kim et al. | |
| 2005/0259217 A1* | 11/2005 | Lin | G02F 1/13342 349/196 |

FOREIGN PATENT DOCUMENTS

| | | |
|---|---|---|
| JP | 2007-093889 A | 4/2007 |
| KR | 10-2001-0075969 A | 8/2001 |

(Continued)

OTHER PUBLICATIONS

International Search Report in International Application No. PCT/KR2016/001922, filed Feb. 26, 2016.

*Primary Examiner* — Mustak Choudhury
(74) *Attorney, Agent, or Firm* — Saliwanchik, Lloyd & Eisenschenk (57) ABSTRACT

A front light unit of an embodiment comprises: a light source unit for an image display device; a light guide unit for guiding light incident from the light source unit and outputting the guided light to a display unit; and a holographic optical element unit being opposite to the display unit and disposed on the light guide unit. Therefore, the present invention can adjust the direction of light output from the light source unit and increase the quantity of light transferred to the display unit, using a pattern formed in the holographical optical element unit, thereby improving the efficiency of light supplied from the light source unit and reducing the sizes of the light unit and the display device including the same.

18 Claims, 8 Drawing Sheets

(51) Int. Cl.
*F21V 8/00* (2006.01)
*G02B 27/01* (2006.01)
*G02B 6/27* (2006.01)
*G02B 6/28* (2006.01)
*G02B 6/34* (2006.01)
*G02F 1/1362* (2006.01)
*G02F 1/13357* (2006.01)

(52) U.S. Cl.
CPC ............. *G02B 6/0031* (2013.01); *G02B 6/27* (2013.01); *G02B 6/2817* (2013.01); *G02B 6/34* (2013.01); *G02B 27/01* (2013.01); *G02B 27/0103* (2013.01); *G02B 27/0172* (2013.01); *G02B 2027/015* (2013.01); *G02B 2027/0118* (2013.01); *G02B 2027/0174* (2013.01); *G02F 1/133615* (2013.01); *G02F 2001/136281* (2013.01)

(58) Field of Classification Search
CPC ........ G02B 13/04; G02B 6/00; G02B 6/0023; G02B 6/0031; G02B 6/27; G02B 6/2817; G02B 6/34; G02B 6/4204; G09F 9/35; G02F 1/1335; G02F 1/1347; G02F 1/1391; G02F 1/13357; G02F 1/133536; G02F 1/13718; G02F 9/35; B60K 35/00
See application file for complete search history.

(56) References Cited

FOREIGN PATENT DOCUMENTS

| KR | 10-0644218 B1 | 11/2006 |
| KR | 10-2011-0033850 A | 3/2011 |
| KR | 10-2011-0050929 A | 5/2011 |
| KR | 10-1128635 B1 | 3/2012 |
| KR | 10-2013-0101819 A | 9/2013 |
| KR | 20130101819 A * | 9/2013 |
| KR | 10-2013-0109046 A | 10/2013 |

* cited by examiner

TOP EMISSION

FRONT LIGHT UNIT AND IMAGE DISPLAY DEVICE

CROSS-REFERENCE TO RELATED APPLICATIONS

This application is the U.S. national stage application of International Patent Application No. PCT/KR2016/001922, filed Feb. 26, 2016, which claims priority to Korean Application Nos. 10-2015-0026973, 10-2015-0027214, and 10-2015-0027229, all filed Feb. 26, 2015, the disclosures of each of which are incorporated herein by reference in their entirety.

TECHNICAL FIELD

Embodiments relate to a front light unit and an image display device.

BACKGROUND ART

An image display device, which converts an image generated and supplied from a display device, such as a liquid crystal (LC) display device or an electro luminescence (EL) display device, into a virtual image using a virtual image optical system and supplies the same to an observer, is commonly known.

Such an image display device is being applied to recently widely used wearable display devices such as, for example, head-mounted displays (HMDs), smart glasses, etc.

Further, the image display device is also being applied to head-up display devices, which display a virtual image indicating various information necessary for traveling to a point on a sight line of a pilot or a driver so that the virtual image is overlaid on the field of view ahead of the pilot or the driver.

A conventional image display device employs a polarization beam splitter in order to transfer light emitted from a light source to a display unit.

In general, a polarization beam splitter divides incident light into polarized components such that a P-wave component passes therethrough and an S-wave component is reflected therefrom and travels to a display unit. At this time, the display unit generates image light using the polarized light supplied from the polarization beam splitter.

However, there is a problem in that the polarization beam splitter is an expensive optical component and in that there is a limitation in the extent to which the size of the image display device can be reduced due to the space occupied by the polarization beam splitter.

DISCLOSURE

Technical Problem

Embodiments provide a front light unit, which includes a holographic optical element unit, instead of a polarization beam splitter, in order to supply light to a display unit, and an image display device, which is capable of efficiently guiding an image toward the eyes of a user.

Technical Solution

In one embodiment, a front light unit includes a light source unit, a light guide unit for guiding light incident thereon from the light source unit so that the light is transferred to a display unit, and a holographic optical element unit disposed on the light guide unit so as to be opposite the display unit.

The holographic optical element unit may include a base substrate and hologram patterns formed on the base substrate.

The holographic optical element unit may have a larger refractive index than the light guide unit.

The hologram patterns may collimate light emitted from the light guide unit.

The hologram patterns may be stripe patterns that are periodically repeated.

The hologram patterns may transmit only light polarized in one direction.

The hologram patterns in a center region of the holographic optical element unit and the hologram patterns in marginal regions surrounding the center region may be different from each other.

The light guide unit may convert light incident thereon from the light source unit into a surface light source.

The light source unit may be disposed near at least one side surface of the light guide unit.

In another embodiment, an image display device includes a display unit for displaying an image, a pentaprism disposed in front of the display unit in order to change a path of light emitted from the display unit and to transmit the light, and a virtual image optical unit for changing a path of light emitted from the pentaprism in order to provide a magnified virtual image corresponding to an image displayed on the display unit for an observer.

The image display device may further include a lens integrally formed at a light-incident surface and a light-emitting surface of the pentaprism.

The virtual image optical unit may include a condensing lens for collecting light emitted from the pentaprism, and a reflection mirror formed to be inclined in front of the condensing lens in order to reflect light that has passed through the condensing lens.

The reflection mirror may have a reflection surface that is oriented toward the observer so that the light reflected by the reflection mirror is transferred toward the observer.

The virtual image optical unit may include a reflection mirror for reflecting light emitted from the pentaprism, and a condensing lens for collecting light emitted from the half-reflection mirror.

The reflection mirror may have a reflection surface that is oriented toward the observer so that the light reflected by the reflection mirror is transferred toward the observer.

The virtual image optical unit may include a polarizing mirror for selectively transmitting light emitted from the pentaprism in accordance with a polarized component, and a reflection mirror for reflecting light that has passed through the polarizing mirror back to the polarizing mirror.

The polarizing mirror may be formed to be inclined so that the light reflected by the reflection mirror is transferred toward the observer.

In a further embodiment, an image display device includes a display unit for displaying an image, a lens for collecting light emitted from the display unit, and a light guide unit for guiding the light collected by the lens to a path oriented to eyes of a person, wherein the display unit and the lens are arranged such that the light emitted from the display unit directly travels to the lens.

The display unit may be a transparent display.

The display unit may be constituted by an organic light-emitting diode (OLED).

Advantageous Effects

A front light unit according to the embodiment is capable of adjusting the direction of light that is transferred to a display unit using a holographic optical element unit, thereby minimizing light loss, improving light efficiency, and greatly reducing the size of a light unit and a display device including the same. Further, it is possible to provide a magnified image using a pentaprism.

DESCRIPTION OF DRAWINGS

FIGS. 12a to 13 are views for explaining an organic light-emitting diode; and

BEST MODE

Reference will now be made in detail to the preferred embodiments, examples of which are illustrated in the accompanying drawings.

It will be understood that when an element is referred to as being "on" or "under" another element, it can be directly on/under the element, or one or more intervening elements may also be present. When an element is referred to as being "on" or "under," "under the element" as well as "on the element" can be included based on the element.

In addition, relational terms, such as "first", "second", "on/upper/above" and "under/lower/below," are used only to distinguish between one subject or element and another subject or element without necessarily requiring or involving any physical or logical relationship or sequence between such subjects or elements.

Figure 1:
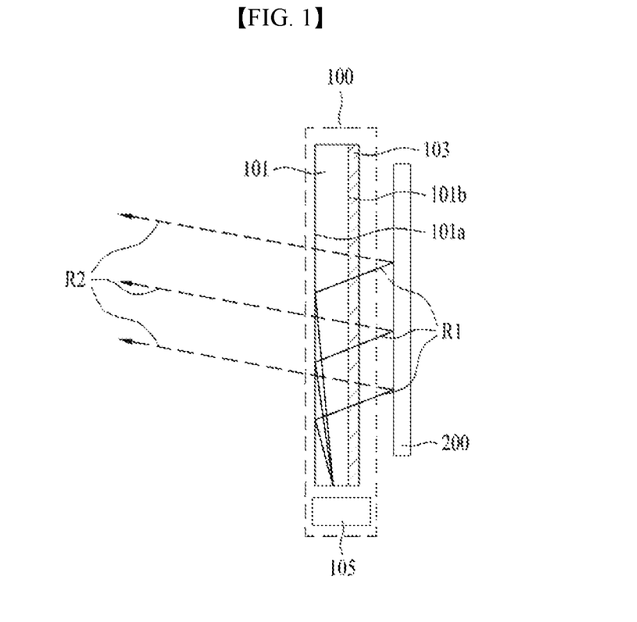
FIG. 1 is a view illustrating a front light unit according to an embodiment.

FIG. 1 is a view illustrating a front light unit according to an embodiment.

A front light unit 100 according to the embodiment may include a light source unit 105, a light guide unit 101 for guiding light incident from the light source unit 105, and a holographic optical element unit 103 disposed on the light guide unit.

The front light unit 100 may be arranged so as to be opposite a display unit 200.

In the front light unit 100, the light source unit 105 may be disposed near at least one side surface of the light guide unit 101.

Referring to FIG. 1, although the light source unit 105 is illustrated as being disposed near one side surface of the light guide unit 101, the disclosure is not limited thereto, and the light source unit 105 may be additionally disposed near the opposite side surface of the light guide unit 101.

The light source unit 105 may include a plurality of light sources.

The light sources may be disposed on a substrate. An electrode pattern for electrical connection with the light sources may be formed on the substrate, and the substrate may be a printed circuit board (PCB) substrate, which is formed of any one material selected from among polyethylene terephthalate (PET), glass, polycarbonate (PC) and silicon (Si).

Further, the substrate may selectively employ a single-layer PCB, a multi-layer PCB, a ceramic substrate, or a metal core PCB.

The light sources may be, for example, light-emitting devices (LEDs) or light amplification by stimulated emission of radiation (LASER) beams; however, the disclosure is not limited thereto.

The light sources may be side-view-type light-emitting diodes or top-view-type light-emitting diodes.

Further, the light sources included in the light source unit 105 may be configured as light-emitting diode (LED) chips, a light-emitting diode package, in which light-emitting diodes (LEDs) are secured to a body, or a light-emitting module, in which an optical member is further included in the light-emitting diode package.

Meanwhile, the light sources included in the light source unit 105 may emit light having different wavelengths from each other or may emit light having the same wavelength band as each other.

At this time, the light source unit may further include a controller for controlling the light emission from the light sources, and the controller may control the light emission by controlling the operation of at least one of the light sources through the substrate on which the light sources are arranged, or may perform control such that the light sources are alternately operated.

The light source unit 105 may emit white light. At this time, each of the light sources may emit white light.

For example, in the case in which the light sources are blue light-emitting diodes that emit light in a blue wavelength range, white light may be realized by coupling a yellow phosphor to each of the light-emitting diodes or using a red phosphor and a green phosphor at the same time, or may be realized using a yellow phosphor, a red phosphor and a green phosphor at the same time on each of the blue light-emitting diodes.

Meanwhile, the light sources may be light-emitting diodes that emit light in different wavelength ranges from each other. For example, the light sources may respectively emit light in a blue wavelength range, a green wavelength range, and a red wavelength range, and these three kinds of light-emitting diodes may be arranged in alignment with each other.

The light source unit 105 may supply light to the light guide unit 101, and, for example, the light emitted from the light-emitting diodes included in the light source unit 105 may be a point light source and may be transferred to the light guide unit 101.

Referring to FIG. 1, in the front light unit 100 according to the embodiment, the light guide unit 101 may guide light incident thereinto from the light source unit 105 and may transfer the same to the display unit 200. At this time, the light supplied from the light guide unit 101 may be a surface light source.

The light guide unit 101 may be formed of transparent polymer resin.

For example, the light guide unit 101 may be made of a material including polymethylmethacrylate (PMMA) or polycarbonate (PC).

Further, the light guide unit 101 may be formed of a material having a refractive index of 1 or more.

Meanwhile, although not illustrated in the drawings, the light guide unit 101 may include a deflection pattern formed on a first surface 101*a* thereof. The deflection pattern may serve to enable the light supplied from the light source unit 105 to the light guide unit 101 to be directed toward a second surface 101*b* of the light guide unit 101.

At this time, the first surface 101*a* and the second surface 101*b* may be surfaces that are opposite each other, and the second surface 101*b* may be a surface that is opposite the display unit 200.

The second surface 101*b* may be a light-emitting surface of the light guide unit 101. Further, the second surface 101*b* may also function as a light-incident surface, through which image light is incident from the display unit 200 to the light guide unit 101.

The holographic optical element unit 103 may be disposed on the light guide unit 101.

For example, the holographic optical element unit 103 may be disposed on the second surface 101*b*, which is the light-emitting surface of the light guide unit 101.

Referring to FIG. 1, the light R1, which is emitted from the light sources of the light source unit 105 and is supplied to the light guide unit 101, may be incident on the display unit 200 via the holographic optical element unit 103 on the light guide unit 101, and the image light R2, which is emitted from the display unit 200, may pass through the holographic optical element unit 103 and the light guide unit 101 and may be transferred to a virtual image optical unit, which will be described later.

Figure 2A:
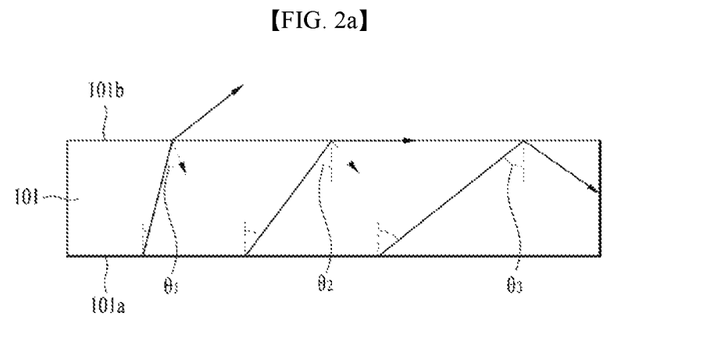
FIGS. 2a and 2b are views illustrating an embodiment showing light emission from a light guide unit.
Figure 2B:
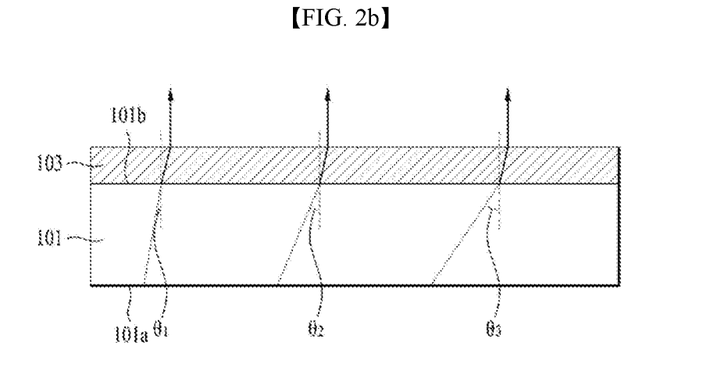

FIGS. 2*a* and 2*b* are views illustrating light emission from the light guide unit 101.

FIG. 2*a* is a view illustrating light emission from the light guide unit 101 on which no holographic optical element unit is disposed, and FIG. 2*b* is a view illustrating light emission in the embodiment in which the holographic optical element unit 103 is disposed on the light guide unit 101.

Referring to FIG. 2*a*, only a part of the light incident into the light guide unit 101 may travel to the outside through the light-emitting surface 101*b*.

That is, in order to allow the light, traveling inside the light guide unit 101, to be emitted outside, the light needs to be incident on the light-emitting surface 101*b* of the light guide unit at an angle smaller than a critical angle $\theta c$.

For example, in FIG. 2*a*, when the angle of incidence of light with respect to the light-emitting surface 101*b* of the light guide unit is $\theta_1$, the light may be emitted outside from the light guide unit 101. At this time, the angle of incidence $\theta_1$ may be smaller than $\theta c$.

Meanwhile, when the critical angle and the angle of incidence are the same ($\theta_2 = \theta c$) or when the angle of incidence is larger than the critical angle ($\theta_3 > \theta c$), the light, traveling inside the light guide unit 101, may not be emitted outside, causing deterioration in light efficiency.

Unlike this, in the embodiment shown in FIG. 2*b*, in which the holographic optical element unit 103 is disposed on the light guide unit 101, even when the light is incident on the light-emitting surface 101*b* at an angle $\theta_2$ or $\theta_3$, which is equal to or greater than the critical angle, the light may be emitted outside via the holographic optical element unit 103.

For example, in the embodiment shown in FIG. 2*b*, the refractive index of the holographic optical element unit 103 may be larger than the refractive index of the light guide unit 101.

Specifically, when the refractive index of the light guide unit is $n_1$ and the refractive index of the holographic optical element unit is $n_2$, they may have a relationship of $1 < n_1 < n_2$ therebetween.

Therefore, the light, which travels from the light guide unit 103 to the holographic optical element unit 103, may be refracted at the boundary surface between the light guide unit and the holographic optical element unit at an angle of refraction that is smaller than the angle of incidence at which the light is incident on the light-emitting surface of the light guide unit, and may be emitted outside via the holographic optical element unit.

That is, owing to the holographic optical element unit 103 disposed on the light guide unit 101, the embodiment may have an effect in that the angle of emission of light at the light-emitting surface 101*b* of the light guide unit 101 is changed and in that the light supplied from the light guide unit is collimated to the display unit.

That is, the holographic optical element unit 103 may increase the amount of light that is emitted outside from the light guide unit by changing the total reflection condition of the light incident on the light-emitting surface 101*b* of the light guide unit.

Figure 3A:
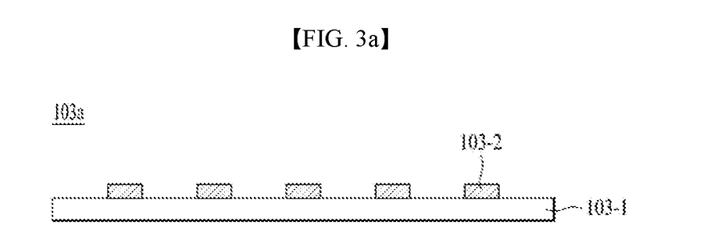
FIGS. 3a and 3b are views illustrating an embodiment of a holographic optical element unit.
Figure 3B:
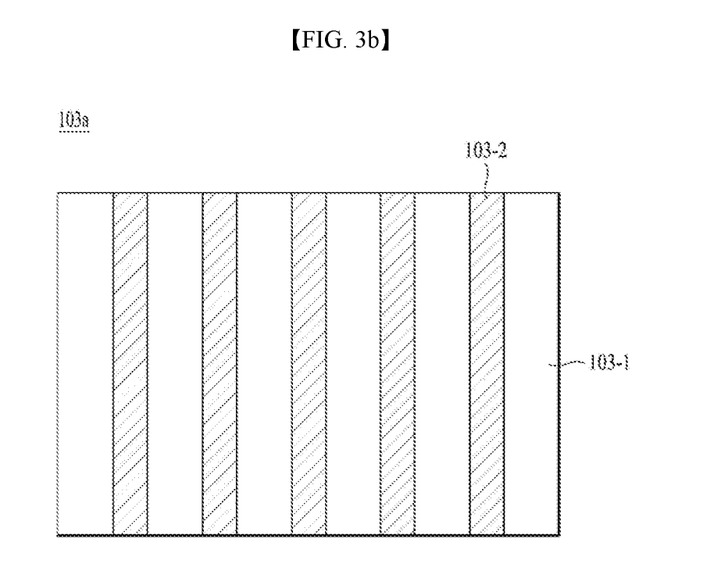

FIGS. 3*a* and 3*b* are views illustrating an embodiment of the holographic optical element unit 103.

FIG. 3*a* is a sectional view of the holographic optical element unit 103, and FIG. 3*b* is a plan view of the holographic optical element unit 103 shown in FIG. 3*a*.

Referring to FIG. 3*a*, the holographic optical element unit 103 may include a base substrate 103-1 and hologram patterns 103-2 formed on the base substrate.

The base substrate 103-1 may be formed of a polymer resin material. For example, the base substrate may be formed of polymethylmethacrylate (PMMA) or polycarbonate (PC).

The hologram patterns 103-2 may be formed of the same material as the base substrate 103-1. For example, the base substrate and the hologram patterns may be formed integrally with each other.

Further, the hologram patterns 103-2 may be embodied as metal lines.

At this time, the hologram patterns 103-2 may be stripe patterns, in which the metal lines are arranged so as to be spaced a constant distance apart from each other, or wire-grid patterns, in which the metal lines are formed so as to intersect each other.

The hologram patterns, which are embodied as the metal lines, may function as a polarizer, which concentrates the light supplied from the light guide unit 101 in one direction or transmits only light polarized in one direction, and the metal-line patterns may be formed on the base substrate 103-1 through a deposition process.

The metal lines, which constitute the patterns, may include at least one metal selected from among aluminum (Al), gold (Au), silver (Ag), platinum (Pt), copper (Cu), nickel (Ni), palladium (Pd), zinc (Zn), iron (Fe), chrome (Cr), and molybdenum (Mo); however, the disclosure is not limited thereto.

The hologram patterns 103-2, which are formed on the holographic optical element unit, may serve to allow the transmission of the collimated light from the light guide unit 101 to the display unit 200.

That is, the hologram patterns may be diffraction patterns, which allow the light emitted from the light guide unit to be incident on the display unit perpendicularly thereto.

For example, in order to transmit the light, traveling inside the light guide unit, toward the display unit, the holographic optical element unit may be disposed on the light-emitting surface of the light guide unit and may change the total reflection condition with respect to the light that is totally reflected from the light-emitting surface and is transferred back to the light guide unit.

Further, the light, which is emitted from the light guide unit to the holographic optical element unit, may be transferred to the display unit through the diffraction patterns, which are formed at the holographic optical element unit.

Further, the hologram patterns, which are formed on the holographic optical element unit, may be stripe patterns that are spaced a constant distance apart from each other so as to transmit only light polarized in one direction. That is, the holographic optical element unit, which includes the hologram patterns embodied as stripe patterns, may transmit only light polarized in one direction, i.e. a P-wave component or an S-wave component of the light supplied from the light guide unit.

FIG. 3b may be a plan view of the embodiment of the holographic optical element unit shown in FIG. 3a, and, for example, may be a plan view of the holographic optical element unit 103, which includes stripe patterns that are periodically repeated.

As described above, the holographic optical element unit 103 according to the embodiment, which includes the stripe patterns, may exhibit the effect of a polarizer, which concentrates the light emitted from the light guide unit 101 so that the light can be transferred to the display unit and transmits only light polarized in one direction.

In addition, the holographic optical element unit 103, which includes the hologram patterns 103-2, is capable of removing noise from the light supplied to the display unit by filtering the light emitted from the light guide unit 101.

Figure 4:
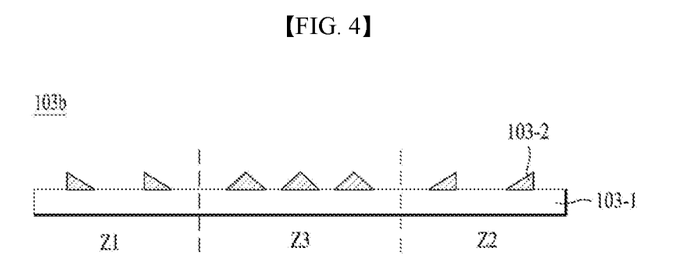
FIG. 4 is a view illustrating an embodiment of the holographic optical element unit.

FIG. 4 is a view illustrating another embodiment of the holographic optical element unit.

Referring to the sectional view in FIG. 4, the hologram patterns 103-2 of the holographic optical element unit may have a triangular-shaped cross section.

Further, in the embodiment shown in FIG. 4, the hologram patterns in the center region Z3 of the holographic optical element unit and the hologram patterns in the marginal regions Z1 and Z2 of the holographic optical element unit may have different shapes from each other.

For example, as shown in FIG. 4, the patterns 103-2 in the center region Z3 of the holographic optical element unit 103 may have an isosceles triangular shape so that the light is concentrated on the center region in order to transmit the light from the light guide unit to the display unit.

Further, the patterns in each of the marginal regions Z1 and Z2 of the holographic optical element unit may have a triangular shape such that the hypotenuse of the triangle or the longest side among the three sides of the triangle is oriented toward the center region of the holographic optical element unit in order to transmit the light to the display unit.

At this time, the patterns in the two opposite marginal regions may be formed symmetrical to each other with respect to the center of the holographic optical element unit, and, in order to concentrate and supply the light in the direction perpendicular to the display unit, may have triangular-shaped cross sections such that the angles of inclination between the longest sides and the bottom sides of the triangles gradually increase from the center of the holographic optical element unit to the marginal regions thereof.

Although one embodiment of the hologram patterns 103-2 of the holographic optical element unit 103 is illustrated in FIGS. 3a, 3b and 4, the shape of the patterns is not limited to the embodiment illustrated in the drawings, and the holographic optical element unit may include hologram patterns having various other shapes. For example, the hologram patterns may be formed in the shape of a curve, or may have a polygonal-shaped cross section.

In the embodiment shown in FIGS. 3a to 4, the hologram patterns 103-2 formed at the holographic optical element unit 103 may diffract the light traveling at the boundary surface between the light guide unit and the holographic optical element unit, thereby minimizing the amount of light that is totally reflected inside the light guide unit and cannot be emitted out of the same, increasing the amount of light supplied to the display unit, and consequently improving the efficiency of the light source unit.

Figure 5:
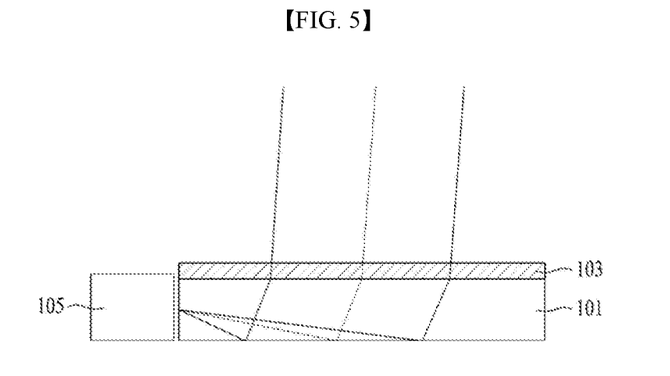
FIG. 5 is a view illustrating the direction in which light travels in the front light unit according to the embodiment.

FIG. 5 is a sectional view of the front light unit according to the embodiment.

Referring to FIG. 5, the light source unit 105 may be disposed near the side surface of the light guide unit 101, and the light transferred to the light guide unit 101 through the side surface thereof may pass through the holographic optical element unit 103 disposed on the light guide unit 101 and may be emitted outside.

In the front light unit according to the embodiment, the hologram patterns formed at the holographic optical element unit may be formed such that the distances between the patterns are adjusted so as to supply the light emitted from the light source unit to the display unit and allow the image light generated by the display unit to be transferred to the virtual image optical unit through the light guide unit without being interrupted by the hologram patterns.

At this time, the light supplied from the light source unit may be a point light source, and the light guide unit may convert the light supplied from the light source unit in the form of a point light source into a surface light source.

The light, which has passed through the light guide unit 101, may be supplied to the display unit in the form of a surface light source.

In the above-described front light unit according to the embodiment, owing to the holographic optical element unit disposed on the light guide unit, it is possible to increase the amount of light that is emitted outside from the light-emitting surface of the light guide unit by changing the direction of travel of the light that is totally reflected by the light-emitting surface of the light guide unit and cannot be emitted outside.

Further, owing to the hologram patterns formed at the holographic optical element unit, it is possible to increase the light efficiency of the light source unit by concentrating the light emitted from the holographic optical element unit toward the display unit.

Meanwhile, in the case of the embodiment in which the holographic optical element unit includes the stripe patterns, since the holographic optical element unit is capable of serving as a polarizer, it is possible to transmit light polarized in one direction to the display unit without an additional polarization beam splitter or polarizer and to reduce the size of the front light unit.

Figure 6:
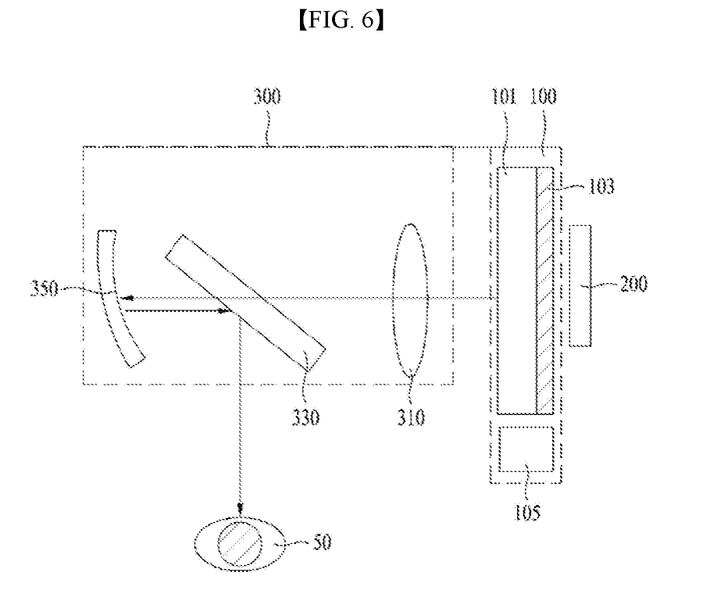
FIG. 6 is a view illustrating an image display device according to an embodiment.

FIG. 6 is a view illustrating an embodiment of an image display device including the aforementioned front light unit.

Referring to FIG. 6, the image display device according to the embodiment may include the front light unit 100 and the reflective-type display unit 200, which have been described above, and a virtual image optical unit 300, which converts image light generated by the reflective-type display unit into a virtual image.

The virtual image optical unit 300 may receive image information output from the reflective-type display unit 200 and may generate an image through conversion of the image information into a virtual image.

That is, the image light, which the reflective-type display unit 200 generates using the light emitted from the front light unit 100, may be projected to the virtual image optical unit 300, the projected image light may be converted into a virtual image through the virtual image optical unit 300, and the virtual image may be output and transferred to a user 50.

The reflective-type display unit 200 may be a display device that generates image light using the light introduced into the front of the display unit as a light source.

For example, the reflective-type display unit 200 may be a reflective-type liquid crystal display device.

Further, the reflective-type display unit 200 may be a liquid-crystal-on-silicone (LCoS) display.

As an example of the reflective-type liquid crystal display device, the LCoS display may include a glass substrate having a transparent electrode, a Si semiconductor substrate, which is disposed opposite the transparent glass substrate and has a driving circuit, and a liquid crystal, which is injected between the two substrates. At this time, a reflective electrode may be formed on the semiconductor substrate.

Referring to FIG. 6, the virtual image optical unit 300 may be disposed opposite the reflective-type display unit 200 with respect to the front light unit 100.

The virtual image optical unit 300 may include a lens unit 310, which transmits image light, at least one virtual-image-converting mirror 350, which converts the image light supplied from the lens unit into a virtual image, and a beam splitter 330, which is disposed between the lens unit 310 and the at least one virtual-image-converting mirror 350.

The lens unit 310 may serve to transmit the image light, which has passed through the front light unit 100, to the at least one virtual-image-converting mirror 350.

For example, the lens unit 310 may be a collimating lens, which converts the image light supplied from the front light unit 100 into parallel light.

The lens unit 310 may serve to concentrate or diffuse light in order to induce the image light to the virtual-image-converting mirror 350.

For example, the lens unit 310 may be formed to be transparent using any one selected from among acryl-based resin, such as polymethylmethacrylate (PMMA), polyethylene terephthalate (PET), cyclic olefin copolymers (COC), polyethylene naphthalate (PEN), polycarbonate (PC), polystyrene (PS) and methacrylate styrene (MS) resin; however, the material of the lens unit 310 is not limited thereto.

The image light, which has passed through the lens unit 310, may be transferred to the beam splitter 330.

The beam splitter 330 may transmit or reflect the image light supplied thereto.

The beam splitter 330 may be a transflective-type mirror.

For example, the image light, which is generated and supplied from the reflective-type display unit 200, may pass through the lens unit 310 and may be transferred to the beam splitter 330, and the beam splitter 330 may transmit the image light supplied thereto to the virtual-image-converting mirror 350.

Further, the virtual image light, which is converted by the virtual-image-converting mirror 350 and is supplied therefrom, may be reflected by the beam splitter 330 and transferred to the user 50.

The virtual image optical unit 300 may include at least one virtual-image-converting mirror 350.

For example, the at least one virtual-image-converting mirror 350 may include any one of a flat mirror, a concave mirror, a convex mirror, and a customized free-form-type mirror.

Further, the at least one virtual-image-converting mirror may be formed so as to include a reflective layer, which is formed of at least one of aluminum (Al), silver (Ag) and gold (Au), disposed on the surface thereof.

The at least one virtual-image-converting mirror may serve to convert a real image into a virtual image and supply the virtual image to the user and may also serve to change the direction in which the real image or the converted virtual image travels.

The at least one virtual-image-converting mirror may have a structure in which a plurality of mirrors is arranged in various forms.

The virtual-image-converting mirror may have a curvature.

The virtual-image-converting mirror may generate a virtual image by reflecting or diffracting image information, which is generated by the reflective-type display unit and is projected on the virtual-image-converting mirror through the front light unit.

For example, the virtual-image-converting mirror may be a concave mirror.

Further, the at least one virtual-image-converting mirror may include a direction-changing mirror. The direction-changing mirror may serve to change the direction in which the image information, which is output and supplied from the reflective-type display unit, is projected.

The direction-changing mirror may be a total reflection mirror, which reflects the projected image while changing the direction thereof.

In the image display device according to the embodiment, owing to the front light unit including the holographic optical element unit, it is possible to minimize the volume of parts that correspond to an illumination system, which generates a real image in the image display device.

Further, it is possible to increase the brightness of the image generated by the display unit by increasing the amount of light supplied to the reflective-type display unit owing to the hologram patterns, and consequently, it is possible to improve the brightness of the virtual image, which is finally transferred to the user.

Meanwhile, the image display device according to the embodiment is capable of being easily applied to wearable displays such as smart glasses due to the reduced size thereof, and is also capable of providing design diversity due to the reduced size thereof when it is applied to head-up display devices for vehicles.

Figure 7:
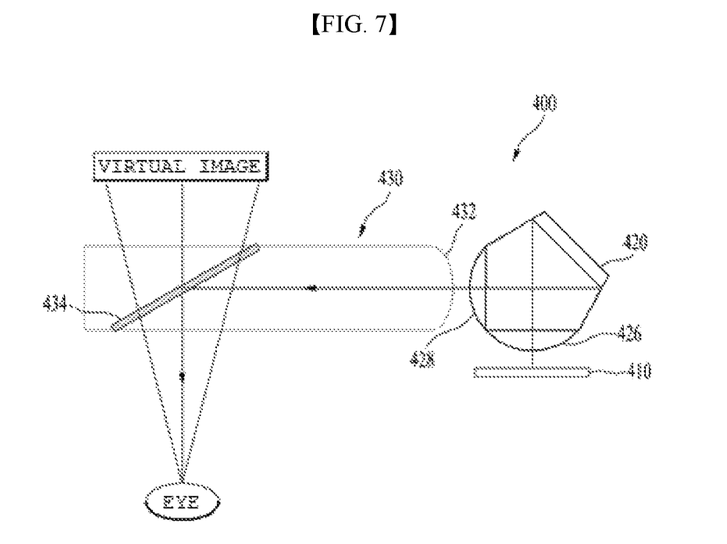
FIG. 7 is a view illustrating the construction of an image display device according to another embodiment.
Figure 8:
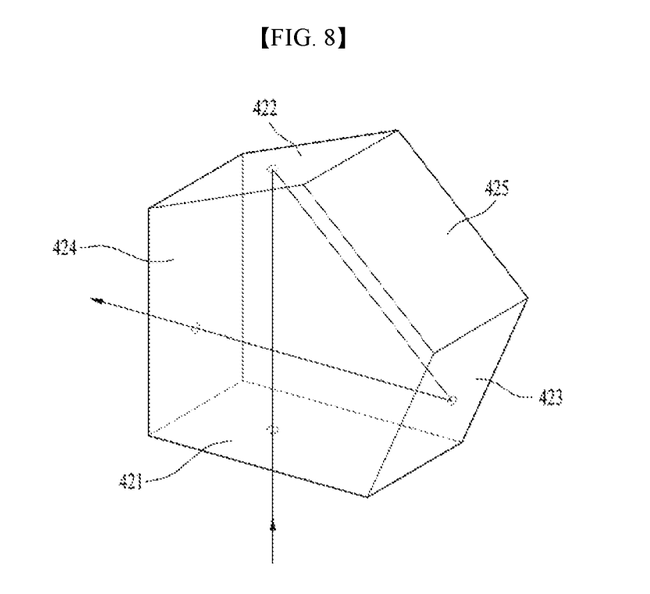
FIG. 8 is a view illustrating the concrete construction of a pentaprism shown in FIG. 7.

FIG. 7 is a view illustrating the construction of an image display device according to another embodiment, and FIG. 8 is a perspective view of a pentaprism 420 shown in FIG. 7.

Referring to FIG. 7, the image display device 400 includes a display unit 410, a pentaprism 420, and a virtual image optical unit 430.

The display unit 410, which is a device for displaying an image, may be embodied as an LCD panel or various other display devices. For example, the display unit 410 may be a reflective-type liquid-crystal-on-silicon (LCoS) device, a digital light processing (DLP) device, a micro LCD device provided with a light source, or a self-illuminating micro OLED device, and may have a size of 1 inch or less. Meanwhile, because the reflective-type LCoS device, the DLP device and the micro LCD device are not self-illuminating devices, an external light source needs to be coupled thereto. That is, a transmissive-type micro LCD panel using a backlight or a reflective-type micro LCD panel using a front light may be used. Because the micro OLED panel is self-illuminating, a separate light source is not required, and therefore the head-mounted display device may be configured to have a smaller size. At this time, an optical system, which adjusts the path of light so that light emitted from the light source is incident into the display unit 410, may be used.

The pentaprism 420, as shown in FIG. 8, is a reflective prism having five surfaces, which may transmit incident light while refracting the same to an angle of 90°.

The pentaprism 420 may include lenses 426 and 428, which are provided at a light-incident surface and a light-emitting surface thereof. Even if there were no lenses 426 and 428, there would be no obstacle in achieving the objects of the disclosure; however, provision of the lenses 426 and 428 may improve resolution.

The pentaprism 420 has five surfaces, specifically, a first surface 421, which is a light-incident surface through which light, which is to be refracted to an angle of 90° and emitted outside the pentaprism 420, is introduced into the pentaprism 420, a second surface 422, which is a surface by which the light introduced through the first surface 421 is first reflected, a third surface 423, which is a surface by which the light reflected by the second surface 422 is secondly reflected, a fourth surface 424, which is a light-emitting surface through which the light reflected by the third surface 423 is emitted outside the pentaprism 420, and a fifth surface 425, which is a surface that is provided between the second surface 422 and the third surface 423 and is not optically used for refraction of the light introduced into the pentaprism 420 to an angle of 90°.

The pentaprism 420, which has the first surface 421 to the fifth surface 425, forms an image through 90-degree refraction in a manner such that light from a subject passes through the first surface 421, is sequentially reflected by the second surface 422 and the third surface 423, and finally passes through the fourth surface 424.

Although the structure of the pentaprism shown in FIG. 8 has been described with reference to the embodiment shown in FIG. 7, it may be identically applied to the embodiment shown in FIGS. 9 and 10.

The virtual image optical unit 430 enables the observer to view a virtual image by reflecting the light emitted from the pentaprism 420 to the observer's eyes. The virtual image optical unit 430 may include a condensing lens 432 and a reflection mirror 434. The condensing lens 432 is disposed in front of the pentaprism 420 in the direction in which the light emitted from the pentaprism travels and serves to collect the emitted light. The condensing lens 432 is a lens that condenses luminous flux (a bundle of light rays), emitted within a certain solid angle from a light source, into a smaller solid angle so as to achieve high illumination. The condensing lens may not require as much precision as an image-forming lens, and the light-condensing solid angle may be as large as possible. Accordingly, the condensing lens has a larger aperture than that corresponding to a focal distance. The condensing lens 432 may be a combination of lenses selected from at least one spherical lens and at least one aspheric lens. The reflection mirror 434 serves to reflect the light that has passed through the condensing lens 432. At this time, the reflection mirror 434, as shown in the drawings, may be formed to be inclined at a predetermined angle (about 45°) with respect to the direction of travel of the light so that the incident light can be reflected to the observer's eyes.

In accordance with the above-described construction, the light emitted from the display unit 410 is refracted to an angle of 90° by the pentaprism 420, is introduced into the optical unit, and is finally reflected by the reflection mirror 434 and emitted therefrom. Through this light path, it is possible for the observer to view a magnified virtual image corresponding to an image displayed on the display unit.

Figure 9:
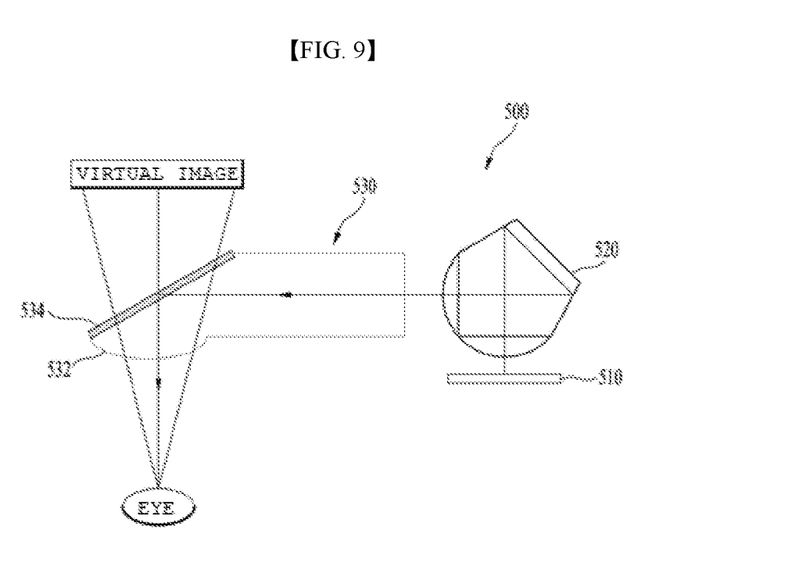
FIGS. 9 and 10 are views illustrating the construction of an image display device according to a further embodiment.

FIG. 9 is a view illustrating the construction of an image display device according to a further embodiment.

An image display device 500 according to this embodiment also includes a display unit 510, a pentaprism 520, a reflection mirror 534, and a virtual image optical unit 530; that is, the construction thereof is almost the same as that of the image display device 400 described above with reference to FIG. 7. Since this embodiment differs from the previous embodiment only in that a condensing lens 532 is formed on a light-emitting surface of a virtual image optical unit 530 and forms the same light path as that of the previous embodiment, a detailed explanation thereof will be omitted.

Figure 10:
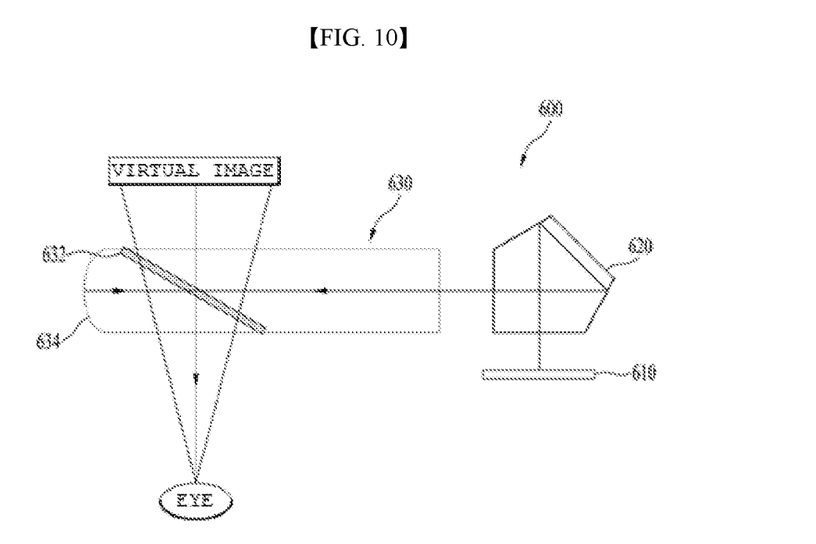

FIG. 10 is a view illustrating the construction of an image display device according to a further embodiment.

FIGS. 7 and 9 illustrate examples of a see-closed-type optical device, and FIG. 10 illustrates an example of a see-through-type optical device.

An image display device 600 according to this embodiment, like the previous embodiments, includes a display unit 610, a pentaprism 620, and a virtual image optical unit 630.

However, the virtual image optical unit 630 includes a polarizing mirror 632 and a reflection mirror 634.

The polarizing mirror 632 selectively converts the incident light into linearly polarized light and transmits the same, and the reflection mirror 634 totally reflects the incident light. That is, a part of the light emitted from the pentaprism 620 is reflected by the polarizing mirror 632, the remaining part thereof passes through the polarizing mirror 632, and the light, which has passed through the polarizing mirror 632, is reflected by the reflection mirror 634 and is transferred toward the observer.

At this time, the polarizing mirror is mounted at an incline in a predetermined direction (about 45°) with respect to the direction of travel of the light. The polarizing mirror 632 divides light into polarized components, and is therefore referred to as a polarization beam splitter (PBS).

Although no lens is illustrated as being provided at a light-incident surface and a light-emitting surface of the pentaprism 620 in this embodiment, an additional lens may be selectively mounted and used as needed.

Figure 11:
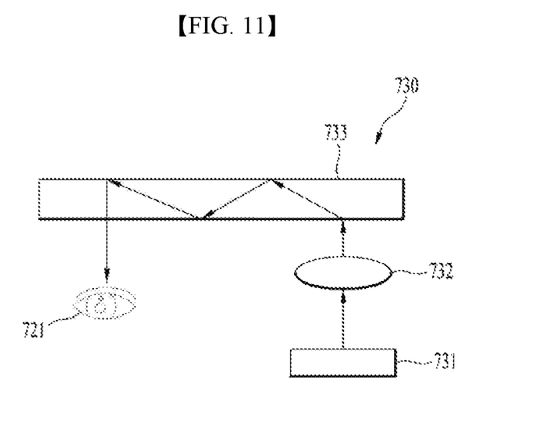
FIG. 11 is a view illustrating an image display device according to a further embodiment.

FIG. 11 is a view illustrating an image display device according to a further embodiment.

Referring to FIG. 11, an image display device 730 according to this embodiment includes a display unit 731, a lens 732, and a light guide unit 733.

The display unit 731 is a component that displays an image, which is to be provided for the user, thereon, and more particularly, does not require a backlight.

Concrete examples of the display unit 731 may include a transparent display that is capable of outputting an image without the necessity of a backlight and a display that is constituted by organic light-emitting diodes (OLEDs).

The organic light-emitting diodes display an image using an organic light-emitting material that self-emits light when voltage is applied thereto.

Figure 12A:
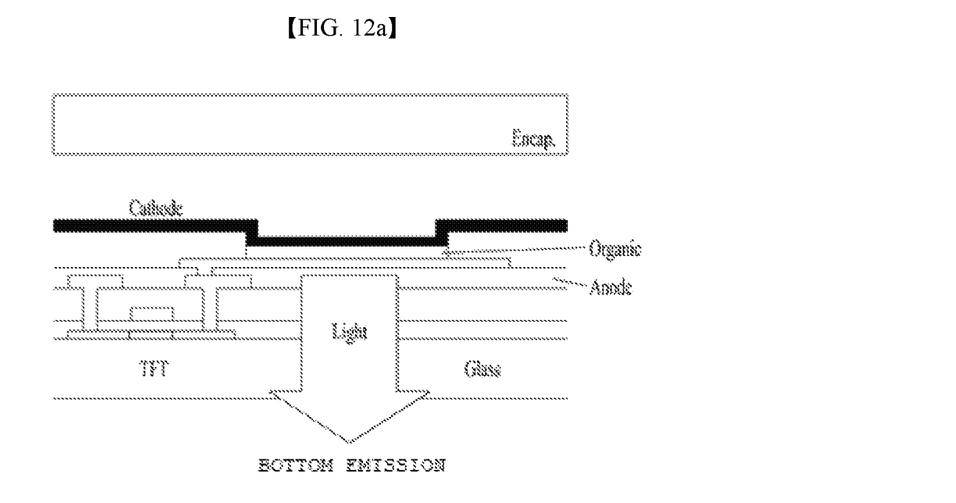
Figure 12B:
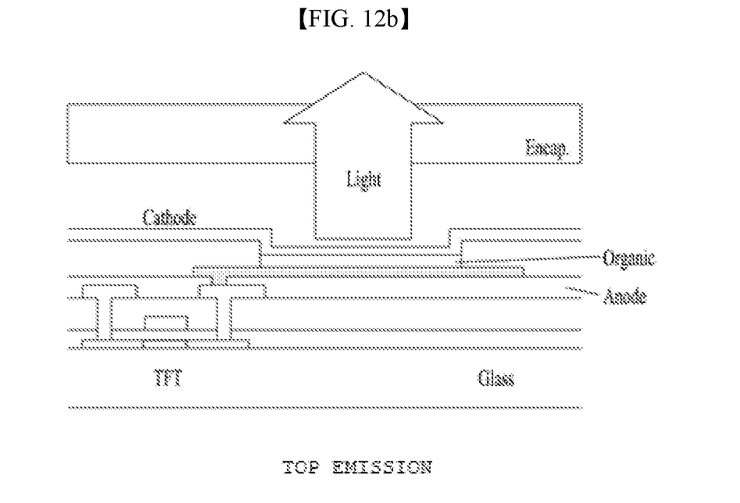
Figure 13:
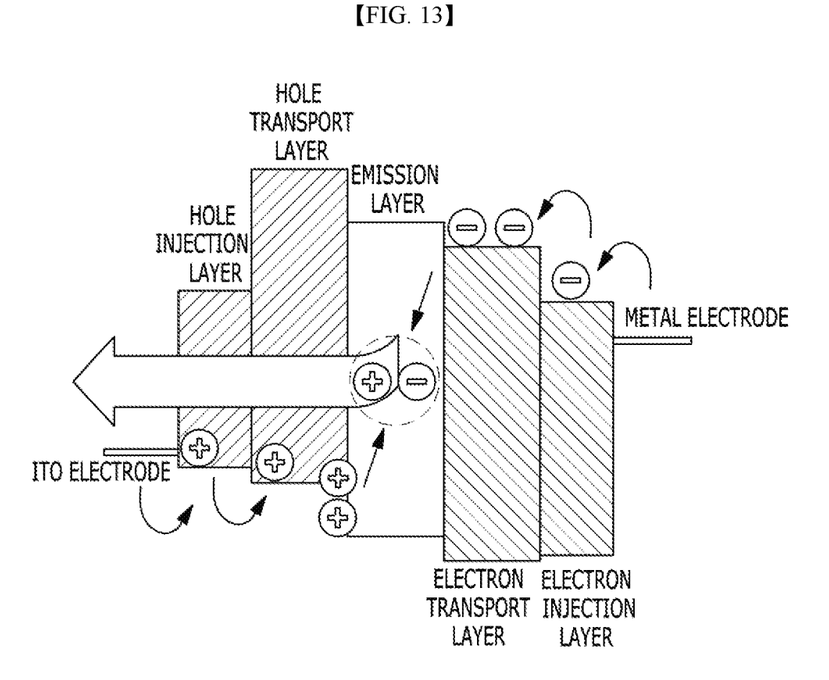

FIGS. 12a to 13 are views illustrating the light-emitting structure of the organic light-emitting diode.

The light-emitting structure of the organic light-emitting diode may be divided into a bottom-emission structure shown in FIG. 12a, in which light is emitted in a direction toward a glass substrate, and a top-emission structure shown in FIG. 12b, in which light is emitted in a direction opposite a glass substrate.

Referring to FIG. 13, the organic light-emitting diode basically includes two electrodes (an ITO electrode and a metal electrode) formed on a transparent substrate, which is formed of glass or plastic, and an organic light-emitting material layer, which is sandwiched between the two electrodes and includes a hole injection layer, a hole transport layer, an emission layer, an electron transport layer, and an electron injection layer.

When voltage is applied to the respective electrodes, holes having (+) charges are generated at the anode, and electrons having (−) charges are generated at the cathode.

When the holes and the electrons are respectively injected into the organic light-emitting material through the hole injection layer and the electron injection layer, the holes and the electrons are coupled to each other at the emission layer via the hole transport layer and the electron transport layer.

At this time, energy contained in the electrons is emitted and stimulates the organic light-emitting material, whereby light is generated. Further, the color of the light is determined by the generated amount of energy and the kind of the organic material that constitutes the emission layer.

Meanwhile, the lens 732 serves to collect the light incident thereon from the display unit 731.

At this time, the display unit 731 and the lens 732 are arranged such that the light emitted from the display unit 731 directly travels to the lens 732.

That is, because the organic light-emitting diode, which is a self-illuminating element, does not require a backlight unit to provide light and it is not necessary to use a polarization beam splitter in order to perform division into a P-wave component and an S-wave component or to change the light path, it is possible to enable the light emitted from the display unit 731 to be directly incident on the lens 732.

Further, the light guide unit 733 guides the light, which is collected by the lens 732, to the path that is oriented to the user's eyes 721.

The shape or structure of the light guide unit 733 may be variously changed as needed, and the basic principle of the magnifying optical system may be applied in order to determine an aperture or a focal distance for image formation of an optical device.

Figure 14:
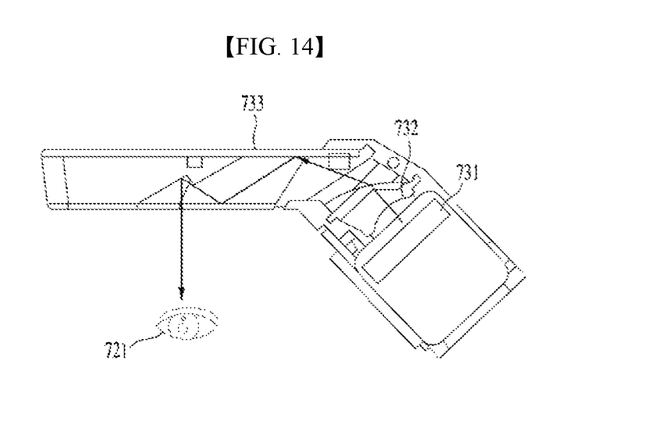
FIG. 14 is a view illustrating a concrete example of the image display device according to the embodiment.

FIG. 14 is a view illustrating a concrete example of the image display device according to the embodiment.

FIG. 14 shows the concrete example of the image display device 730, which includes the display unit 731, the lens 732 and the light guide unit 733, and the path of light through which the light emitted from the display unit 731 reaches the user's eyes 721.

Since the display unit 731 and the lens 732 are arranged directly opposite each other, the light (the image) emitted from the display unit 731 is directly incident on the lens 732 without the necessity of change of the path, and the incident light collected by the lens 732 is guided by the light guide unit 733 so as to be visible to the user's eyes 721.

At this time, the image, which is visible to the user's eyes 721, may be processed to be a real image or a virtual image as needed, or may be processed to be projected in the air.

While the present disclosure has been particularly shown and described with reference to exemplary embodiments thereof, these embodiments are only proposed for illustrative purposes and do not restrict the present disclosure, and it will be apparent to those skilled in the art that various changes in form and details may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

MODE FOR INVENTION

Various embodiments have been described in the best mode for carrying out the invention.

INDUSTRIAL APPLICABILITY

An image display device according to the embodiment is capable of adjusting the direction of light that is transferred to a display unit, thereby minimizing light loss, improving light efficiency, and greatly reducing the size of an image display device.

The invention claimed is:

1. A front light unit comprising:
a light source;
a light guide that guides light incident thereon from the light source so that the light is transferred to a display; and
a holographic optical element disposed on the light guide so as to be opposite the display and configured to generate a three-dimensional image,
wherein the holographic optical element includes a base substrate and hologram patterns formed on the base substrate,
wherein the hologram patterns in a center region of the holographic optical element and the hologram patterns in marginal regions surrounding the center region are different from each other, and
wherein the holographic optical element has a refractive index larger than that of the light guide.

2. The front light unit according to claim 1, wherein the hologram patterns collimate light emitted from the light guide.

3. The front light unit according to claim 1, wherein the hologram patterns are stripe patterns that are periodically repeated.

4. The front light unit according to claim 3, wherein the hologram patterns transmit only light polarized in one direction.

5. The front light unit according to claim 1, wherein the light guide converts light incident thereon from the light source into a surface light source.

6. The front light unit according to claim 1, wherein the light source is disposed near at least one side surface of the light guide.

7. An image display device comprising:
a display for displaying an image;
a pentaprism disposed in front of the display in order to change a path of light emitted from the display and to transmit the light, being configured to have five surfaces such that light incident to the pentaprism is refracted at an angle of 90° before being emitted from the pentaprism; and a virtual image optical unit for changing a path of light emitted from the pentaprism in order to provide a magnified virtual image corresponding to an image displayed on the display for an observer, wherein the virtual image optical unit includes a condensing lens that collects light emitted from the pentaprism and a reflection mirror formed to be inclined in front of the condensing lens in order to reflect light that has passed through the condensing lens.

8. The image display device according to claim 7, comprising:

a lens integrally formed at a light-incident surface and a light-emitting surface of the pentaprism.

9. The image display device according to claim 7, wherein the virtual image optical unit includes:

a reflection mirror that reflects light emitted from the pentaprism; and a condensing lens that collects light emitted from the reflection mirror.

10. The image display device according to claim 9, wherein the reflection mirror has a reflection surface that is oriented toward the observer so that the light reflected by the reflection mirror is transferred toward the observer.

11. The image display device according to claim 7, wherein the virtual image optical unit includes:

a polarizing mirror that selectively transmits light emitted from the pentaprism in accordance with a polarized component; and a reflection mirror that reflects light that has passed through the polarizing mirror back to the polarizing mirror.

12. The image display device according to claim 11, wherein the polarizing mirror is formed to be inclined so that the light reflected by the reflection mirror is transferred toward the observer.

13. An image display device comprising:

a front light that emits light, comprising a holographic optical element configured to generate a three-dimensional image and a light guide that guides light incident thereon from a light source;

a reflective-type display that receives the light emitted from the front light and generates image light; and a virtual image optical unit that converts the image light generated by the display into a virtual image, wherein the virtual image optical unit includes:

a lens that transmits the image light;

at least one virtual-image-converting mirror that converts the image light supplied from the lens into a virtual image; and a beam splitter disposed between the lens-unit and the at least one virtual-image-converting mirror, wherein the holographic optical element has a refractive index larger than that of the light guide.

14. The image display device according to claim 13, wherein the reflective-type display is a reflective-type liquid crystal display device.

15. The image display device according to claim 13, wherein the reflective-type display is a liquid-crystal-on-silicone (LCoS) display.

16. The image display device according to claim 13, wherein the lens collimates light emitted from the front light.

17. The image display device according to claim 13, wherein the beam splitter selectively transmits light emitted from the display in accordance with a polarized component.

18. The image display device according to claim 13, wherein the beam splitter has a reflection surface that is oriented toward the observer so that the light reflected by the virtual-image-converting mirror is transferred toward the observer.

* * * * *